US012794684B2

(12) United States Patent
Kususe et al.

(10) Patent No.: US 12,794,684 B2
(45) Date of Patent: Nov. 10, 2026

(54) QUANTUM CRYPTOGRAPHIC COMMUNICATION CONTROL DEVICE, QUANTUM CRYPTOGRAPHIC COMMUNICATION CONTROL METHOD, AND PROGRAM

(71) Applicants: KABUSHIKI KAISHA TOSHIBA, Tokyo (JP); TOSHIBA DIGITAL SOLUTIONS CORPORATION, Kawasaki (JP)

(72) Inventors: Kanata Kususe, Inagi Tokyo (JP); Ririka Takahashi, Setagaya Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 304 days.

(21) Appl. No.: 18/523,062

(22) Filed: Nov. 29, 2023

(65) Prior Publication Data

US 2024/0178995 A1 May 30, 2024

(51) Int. Cl.
*H04L 9/08* (2006.01)

(52) U.S. Cl.
CPC .................................. *H04L 9/0855* (2013.01)

(58) Field of Classification Search
CPC ..................................................... H04L 9/0855
USPC .......................................................... 380/278
See application file for complete search history.

(56) References Cited

U.S. PATENT DOCUMENTS 7,392,378 B1 6/2008 Elliott
7,441,267 B1 10/2008 Elliott
7,706,535 B1 * 4/2010 Pearson ................ H04L 9/0855 380/255
8,798,034 B2 * 8/2014 Aggarwal ............ H04W 40/02 370/356
10,223,182 B2 3/2019 Takahashi
(Continued)

FOREIGN PATENT DOCUMENTS

JP 4778043 B2 9/2011
JP 2014-241464 A 12/2014
JP 2016-127482 A 7/2016

OTHER PUBLICATIONS

Chen et al.; "APR-QKDN: A Quantum Key Distribution Network Routing Scheme Based on Application Priority Ranking", 2022, Entropy 24, 1519, pp. 1-15. (Year: 2022).*
(Continued)

*Primary Examiner* — Rupal Dharia
(74) *Attorney, Agent, or Firm* — Finnegan, Henderson, Farabow, Garrett & Dunner, LLP

(57) ABSTRACT

A quantum cryptographic communication control device includes a collection unit, a calculation unit, a guarantee unit, and a selection unit. The collection unit collects link information of a link for which a local key is generated by quantum key distribution and a global key guarantee amount expected for a pair of applications that perform cryptographic communication by using a global key. The calculation unit calculates a link cost used for selecting a route of the global key based on the link information. The guarantee unit calculates an amount that can be guaranteed for a local key used in the link so as to satisfy the global key guarantee amount. The selection unit selects the route of the global key based on the link cost and the amount that can be guaranteed.

13 Claims, 11 Drawing Sheets

(56) References Cited

U.S. PATENT DOCUMENTS

| | | | | |
|---|---|---|---|---|
| 2009/0213849 | A1 | 8/2009 | Sachs et al. | |
| 2014/0365774 | A1 | 12/2014 | Tanizawa et al. | |
| 2015/0049614 | A1* | 2/2015 | Yamada | H04L 45/124 370/238 |
| 2016/0197723 | A1* | 7/2016 | Takahashi | G06F 11/0709 380/255 |
| 2019/0260581 | A1* | 8/2019 | Su | H04L 9/08 |
| 2021/0211910 | A1* | 7/2021 | Lucas | H04W 24/08 |
| 2021/0328784 | A1* | 10/2021 | Doi | H04L 9/0855 |
| 2023/0299952 | A1* | 9/2023 | Yu | H04L 45/124 713/189 |

OTHER PUBLICATIONS

Van Meter et al.; "A Quantum Internet Architecture", 2022, IEEE International Conference on Quantum Computing and Engineering, pp. 341-352. (Year: 2022).*

Kaewpuang et al.; "Resource Allocation in Quantum Key Distribution (QKD) for Space-Air-Ground Integrated Networks", 2022, arXiv:2208.08009v1, pp. 1-6. (Year: 2022).*

Xu et al.; "Stochastic Resource Allocation in Quantum Key Distribution for Secure Federated Learning", 2022 IEEE Global Communications Conference: Mobile and Wireless Networks, pp. 4377-4382. (Year: 2022).*

Wong et al.; "Cascading attack on trusted-relay quantum key distribution networks", 2021, Institute of Theoretical Physics CAS, Chinese Physical Society and IOP Publishing, pp. 1-5. (Year: 2021).*

Notzel et al.,; "Entanglement-Enhanced Communication Networks", 2020 IEEE International Conference on Quantum Computing and Engineering, pp. 242-248. (Year: 2020).*

Yang et al.; "Quantum Key Distribution Network: Optimal Secret-Key-Aware Routing Method for Trust Relaying" 2018, China Communications, pp. 33-45. (Year: 2018).*

Van Meter et al.; "Path Selection for Quantum Repeater Networks", 2012, arXiv:1206.5655v1, pp. 1-12. (Year: 2012).*

Japan Patent Office, Office Action in JP App. No. 2022-192202 (May 13, 2025).

Li-Quan Chen et al., "ADA-QKDN: a new quantum key distribution network routing scheme based on application demand adaptation," Quantum Information Processing, vol. 20, No. 309, DOI:10.1007/s11128-021-03246-2, 22 pages (2021).

Chao Yang et al., "Quantum Key Distribution Network: Optimal Secret-Key—Aware Routing Method for Trust Relaying," China Communications, vol. 15, No. 2, pp. 33-45, DOI:10.1109/CC.2018.8300270 (2018).

* cited by examiner

FIG. 6

302

| | APPLICATION PAIR INFORMATION | DESCRIPTION |
|---|---|---|
| | **APPLICATION PAIR** | INFORMATION OF PAIR OF APPLICATIONS THAT PERFORM CRYPTOGRAPHIC COMMUNICATION |
| OPTIONAL | DOMAIN | INFORMATION OF ADMINISTRATOR (OWNER) OF PAIR OF APPLICATIONS |
| | TRANSMISSION SIDE BASE (NODE) | INFORMATION INDICATING BASE WHERE TRANSMISSION SIDE OF PAIR OF APPLICATIONS IS DISPOSED |
| | RECEPTION SIDE BASE (NODE) | INFORMATION INDICATING BASE WHERE RECEPTION SIDE OF PAIR OF APPLICATIONS IS DISPOSED |
| | GLOBAL KEY GUARANTEE AMOUNT | GUARANTEE AMOUNT OF ENCRYPTION KEY EXPECTED BY ADMINISTRATOR OF APPLICATION PAIR PER UNIT TIME (BYTES) |
| OPTIONAL | KEY LENGTH | LENGTH OF ENCRYPTION KEY |
| OPTIONAL | KEY GUARANTEE START DATE AND TIME | START DATE AND TIME OF ENCRYPTION KEY GUARANTEE |
| OPTIONAL | KEY GUARANTEE END DATE AND TIME | END DATE AND TIME OF ENCRYPTION KEY GUARANTEE |
| | GLOBAL KEY STORAGE AMOUNT | ENCRYPTION KEY STORAGE AMOUNT OF APPLICATION PAIR (BYTES) |
| | GLOBAL KEY CONSUMPTION AMOUNT | ENCRYPTION KEY CONSUMPTION AMOUNT USED BY APPLICATION PAIR PER UNIT TIME (BYTES, bps) |
| | GLOBAL KEY GENERATION AMOUNT | ENCRYPTION KEY AMOUNT GENERATED FOR APPLICATION PAIR PER UNIT TIME (BYTES, bps) |

FIG. 7

301

OPTIONAL

| LINK INFORMATION | DESCRIPTION |
|---|---|
| **LINK** | INFORMATION OF LINK TO WHICH NODE IS CONNECTED |
| STATUS | OPERATION STATUS OF LINK AND OPERATION STATUS OF NODES CONSTITUTING LINK |
| NETWORK INFORMATION | INFORMATION OF TRANSMISSION BASE AND RECEPTION BASE OF LINK |
| MAXIMUM LOCAL KEY STORAGE AMOUNT | MAXIMUM ENCRYPTION KEY STORAGE AMOUNT OF LINK (BYTES) |
| LOCAL KEY STORAGE AMOUNT | ENCRYPTION KEY STORAGE AMOUNT OF LINK (BYTES) |
| LOCAL KEY GENERATION AMOUNT | ENCRYPTION KEY CUMULATIVE GENERATION AMOUNT OF LINK (BYTES, bps) |
| LOCAL KEY CONSUMPTION AMOUNT | ENCRYPTION KEY CUMULATIVE CONSUMPTION AMOUNT OF LINK (BYTES, bps) |
| LOCAL KEY RESERVED AMOUNT | TOTAL VALUE OF AMOUNT OF LOCAL KEY RESERVED IN ORDER TO SATISFY GLOBAL KEY GUARANTEE AMOUNT EXPECTED BY EACH APPLICATION PAIR FOR LINK (BYTES) |
| TIME | TIME STAMP WHEN INFORMATION IS RECORDED |
| QKD PERFORMANCE | PERFORMANCE OF QKD DEVICE (GENERATION AMOUNT OF SECURE KEY, RATE, AND ERROR RATE) |

FIG. 8

303

| | APPLICATION PAIR INFORMATION | DESCRIPTION |
|---|---|---|
| COMPOSITE KEY | **LINK** | INFORMATION OF LINK TO WHICH NODE IS CONNECTED |
| COMPOSITE KEY | **APPLICATION PAIR** | INFORMATION OF PAIR OF APPLICATIONS THAT PERFORM CRYPTOGRAPHIC COMMUNICATION |
| | LOCAL KEY RESERVED AMOUNT | AMOUNT OF LOCAL KEY RESERVED IN ORDER TO SATISFY GLOBAL KEY GUARANTEE AMOUNT EXPECTED BY ONE APPLICATION PAIR FOR LINK (BYTES)<br>* AMOUNT IS NOT TOTAL VALUE |
| OPTIONAL | KEY RESERVATION START DATE AND TIME | START DATE AND TIME OF ENCRYPTION KEY GUARANTEE |
| OPTIONAL | KEY RESERVATION END DATE AND TIME | END DATE AND TIME OF ENCRYPTION KEY GUARANTEE |

QUANTUM CRYPTOGRAPHIC COMMUNICATION CONTROL DEVICE, QUANTUM CRYPTOGRAPHIC COMMUNICATION CONTROL METHOD, AND PROGRAM

CROSS-REFERENCE TO RELATED APPLICATION (S)

This application is based upon and claims the benefit of priority from Japanese Patent Application No. 2022-192202, filed Nov. 30, 2022, the entire contents of which are incorporated herein by reference.

FIELD

Embodiments of the present invention relate to a quantum cryptographic communication control device, a quantum cryptographic communication control method, and a program.

BACKGROUND

In cryptographically protected networks, methods are known in the prior art that route important data traffic away from dangerous or slow links, and the like, based on the remaining cryptographic capacity of a link. In addition, network routing devices (for example, routers and the like) are known in the prior art that perform "flow control" based on the remaining cryptographic capacity of a link.

Examples of related art include U.S. Pat. Nos. 7,392,378B and 7,441,267B.

DESCRIPTION OF THE DRAWINGS

FIG. 6 is a diagram showing an example of application pair information according to the embodiment;

FIG. 7 is a diagram showing an example of link information according to the embodiment;

FIG. 8 is a diagram showing an example of application pair-link information according to the embodiment;

DETAILED DESCRIPTION

The conventional technology has the problem that it is not always possible to guarantee the quality of service (QoS) originally expected by the application.

A quantum cryptographic communication control device according to an embodiment includes a collection unit, a calculation unit, a guarantee unit, and a selection unit. The collection unit collects link information of a link for which a local key is generated by quantum key distribution and a global key guarantee amount expected for a pair of applications that perform cryptographic communication by using a global key. The calculation unit calculates a link cost used for selecting a route of the global key based on the link information. The guarantee unit calculates an amount that can be guaranteed for a local key used in the link so as to satisfy the global key guarantee amount. The selection unit selects the route of the global key based on the link cost and the amount that can be guaranteed.

Embodiments of a quantum cryptographic communication control device, a quantum cryptographic communication control method, and a program will be described in detail below with reference to the accompanying drawings.

First Embodiment

Figure 1:
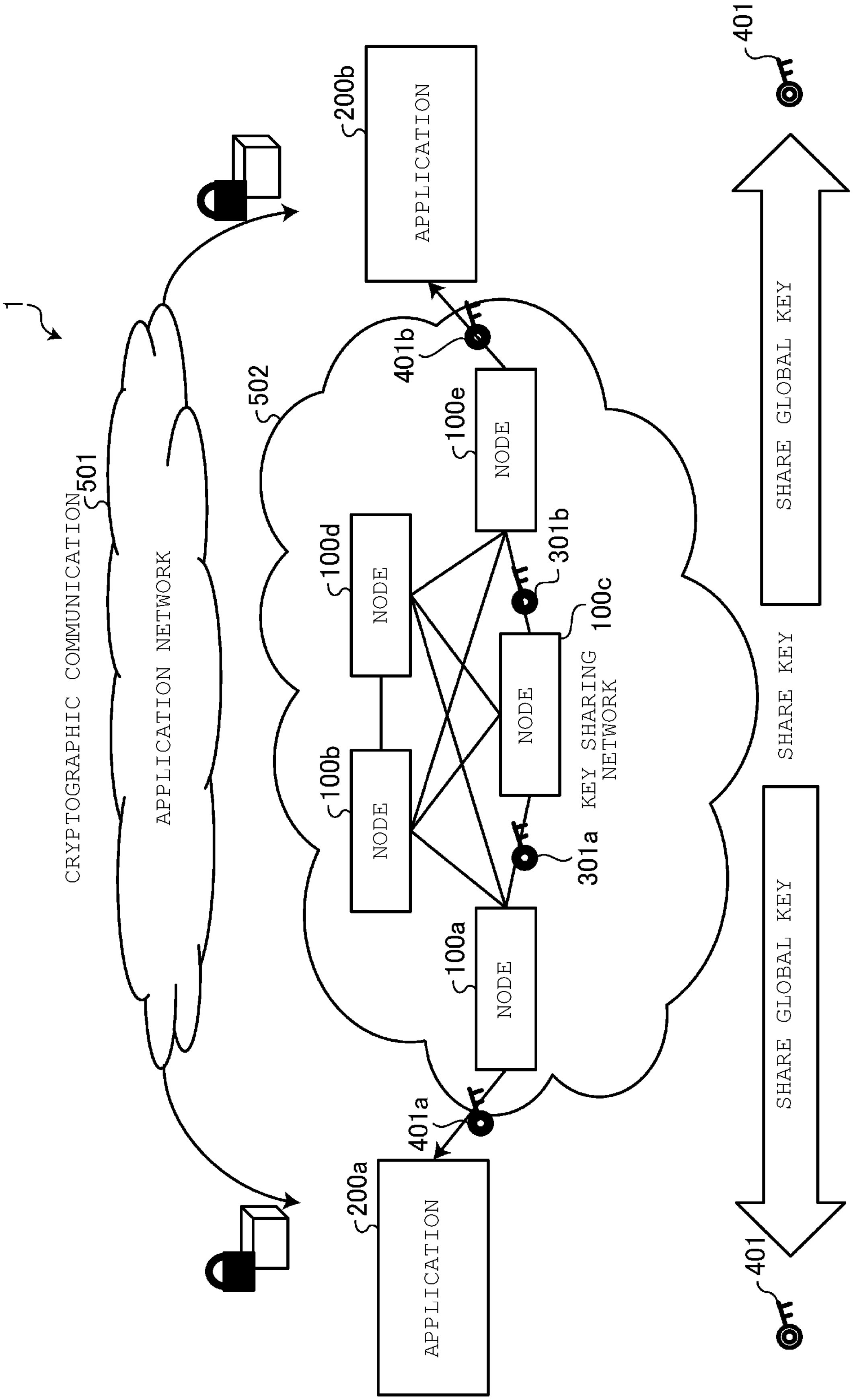
FIG. 1 is a diagram showing an example of a configuration of a quantum cryptographic communication system according to an embodiment.

First, an example of the configuration of the quantum cryptographic communication system according to an embodiment will be described. FIG. 1 is a diagram showing an example of the configuration of a quantum cryptographic communication system 1 according to an embodiment. The quantum cryptographic communication system 1 of the embodiment includes nodes 100*a* to 100*e*, applications 200*a* to 200*b*, an application network 501, and a key sharing network (QKD network) 502.

For example, the node 100*a* is connected to the nodes 100*b*, 100*c*, and 100*d* via a link. The node 100*a* shares a local key (quantum key) 301*a* by quantum key distribution (QKD) via a link with the node 100*b*. The node 100*a* also generates an encryption key, which is a random number, as a global key 401*a* independently of the encryption key (quantum key) generation by QKD, and provides the encryption key to the application 200*a*.

Also, for example, the node 100*e* is connected to the nodes 100*b*, 100*c*, and 100*d* via a link. The node 100*e* shares a local key 301*b* by QKD via link with node 100*c*. The node 100*e* also generates an encryption key, which is a random number, as a global key 401*b* independently of the encryption key generation by QKD, and provides the encryption key to the application 200*b*.

Hereinafter, the nodes 100*a* to 100*e* are simply referred to as a node 100 when not distinguished. The applications 200*a* and 200*b* are simply referred to as an application 200 when not distinguished. The local keys 301*a* to 301*b* are simply referred to as a local key 301 when not distinguished. The global keys 401*a* to 401*b* are simply referred to as a global key 401 when not distinguished.

The application 200 performs cryptographic communication using the global key 401 via the application network 501.

The application network 501 is a network through which data encrypted with the global key 401 is transmitted and received.

The key sharing network 502 is a network in which the local key 301 is shared among the nodes 100 connected by a link.

Although the number of nodes 100 is five in the example of FIG. 1, the number of nodes 100 is not limited to five. Further, although the number of applications 200 is two in the example of FIG. 1, the number of applications 200 is not limited to two.

Figure 2:
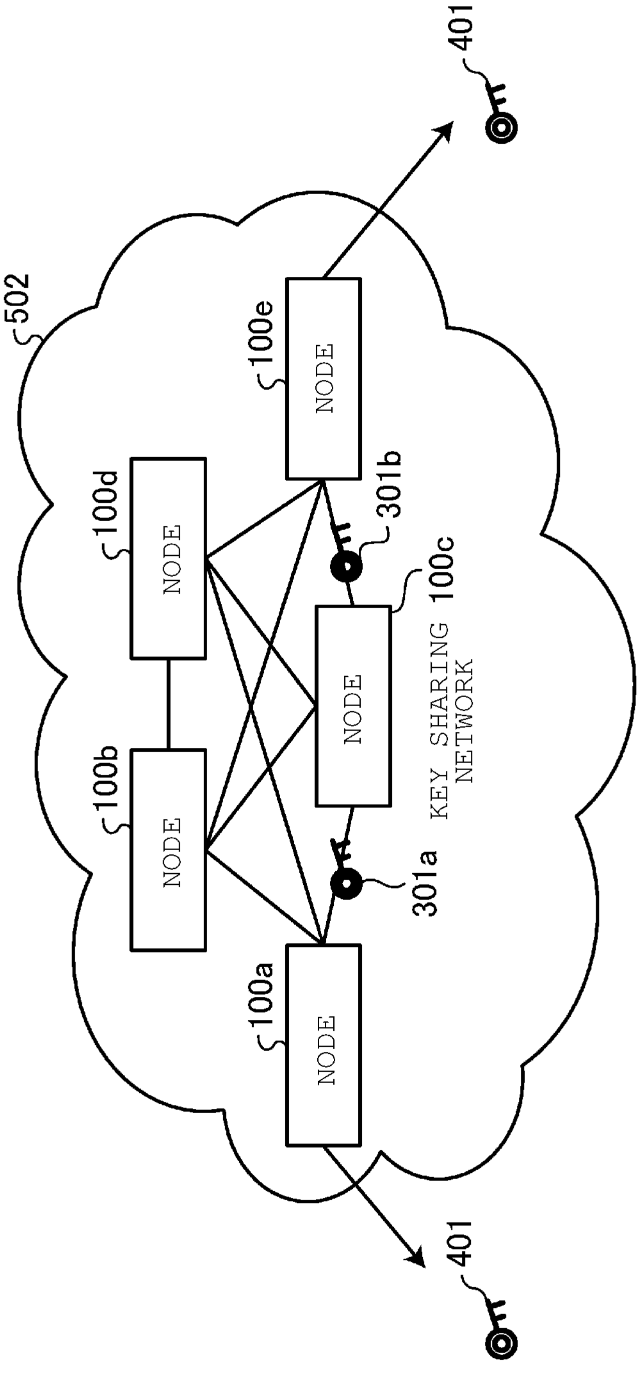
FIG. 2 is a diagram showing an example of global key sharing processing according to the embodiment.

FIG. 2 is a diagram showing an example of sharing processing of the global key 401 according to the embodiment. As described above, the node 100 is equipped with QKD functionality. Specifically, the node 100 has a function of generating and sharing a random number between the nodes 100 connected via a link, and a function of performing cryptographic communication on the key sharing network 502 by using the generated random number as the local key 301.

The specific node 100 (nodes 100*a* and 100*e* in the example of FIG. 2) has a function of generating a random number (global key 401 in the example of FIG. 2) independently of the QKD functionality, and a function of transmitting the random number generated by the function to the opposite device.

Each node 100 performs routing to share the global key 401. Each node 100 shares (relays) the global key 401 by using the path determined by routing. The global key 401 is encrypted by OTP (One Time Pad) communication using the local key 301 shared between the opposite nodes 100 connected via a link, and is safely relayed to the opposite node 100.

In the example of FIG. 2, the global key 401 is shared between the nodes 100*a* and 100*e*, and the global key 401 is provided to the applications 200*a* and 200*b*.

Figure 3:
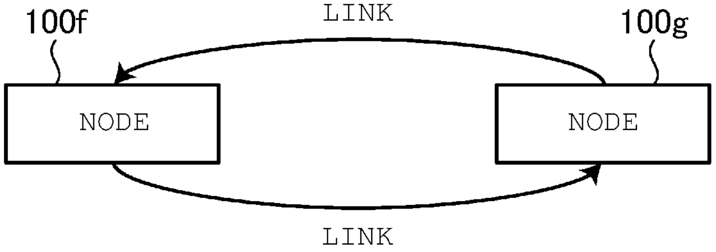
FIG. 3 is a diagram showing an example of a configuration of a minimum unit key sharing network.

FIG. 3 is a diagram showing an example of the configuration of the minimum unit key sharing network 502. The example of FIG. 3 shows a case where the nodes 100*f* and 100*g* are connected by a link and QKD is performed by the link. As shown in FIG. 3, the configuration of the minimum unit key sharing network 502 includes a pair of nodes 100*f* and 100*g*.

Figure 4:
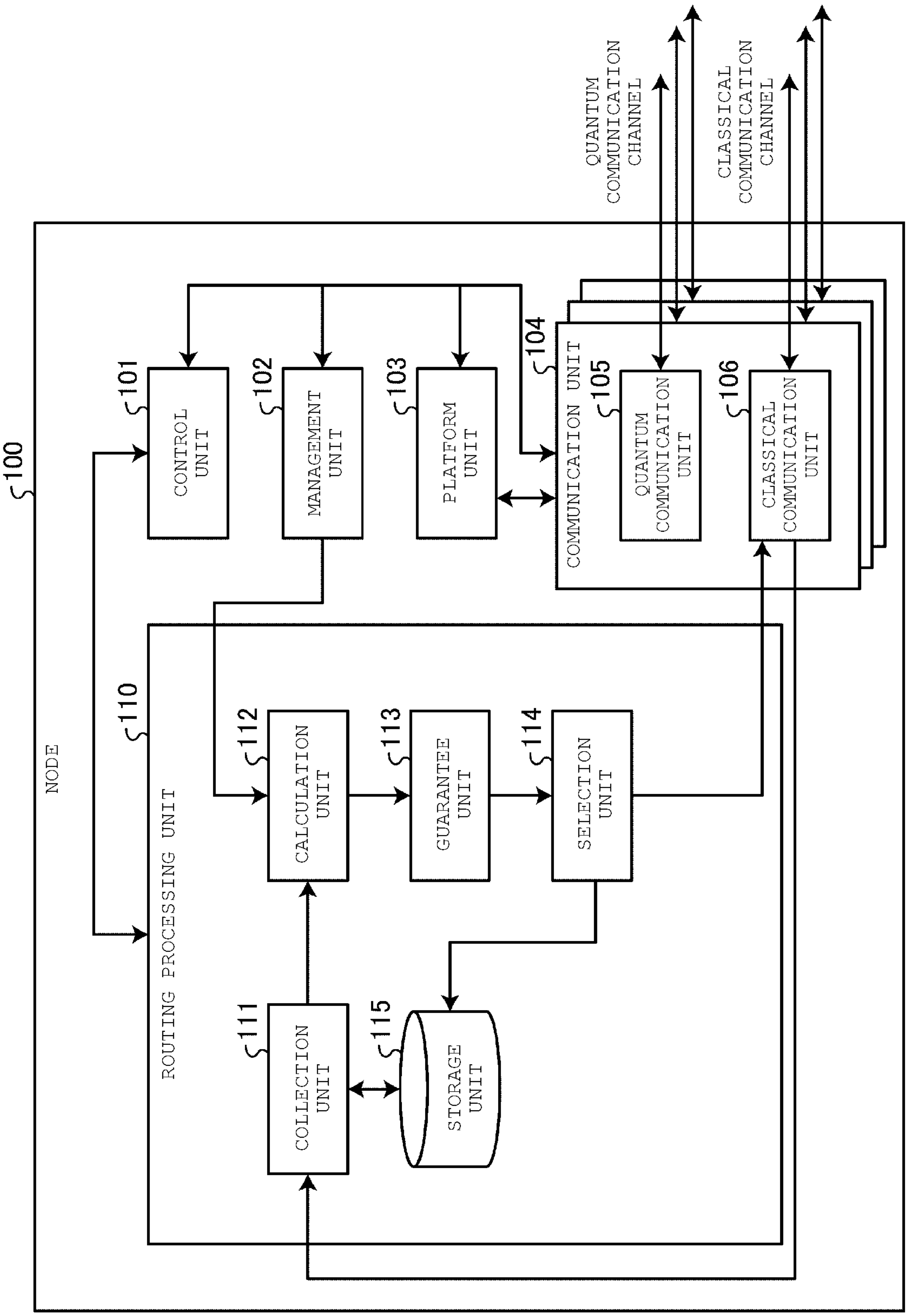
FIG. 4 is a diagram showing an example of a functional configuration of a node according to the embodiment.

FIG. 4 is a diagram showing an example of the functional configuration of the node 100 of the embodiment. The node 100 (an example of a quantum cryptographic communication control device) according to the embodiment includes a control unit 101, a management unit 102, a platform unit 103, a communication unit 104, and a routing processing unit 110.

The control unit 101 controls processing performed by the node 100. The control unit 101, for example, starts up each component. The control unit 101 also controls the timing of route calculation (route recalculation) performed by the routing processing unit 110.

For example, when the global key guarantee amount requested by a pair of new applications 200 is added, when the global key guarantee amount of a pair of the existing applications 200 is deleted, when the global key guarantee amount of a pair of the existing applications 200 is changed, or when the global key guarantee amount can no longer be guaranteed on a current relay route (distribution route), the control unit 101 calculates the link cost used for selecting the relay route of the global key 401 and the amount of local key that can be used for relaying the global key, and to select the relay route. Here, the global key guarantee amount may be, for example, the global key amount required by the application 200 per unit time.

Further, for example, the control unit 101 periodically calculates the link cost and the amount that can be guaranteed for the local key 301 and to select the relay route. By periodically recalculating the global key relay route, the local key consumption amount of each link can be optimized as a whole.

Further, for example, when at least one of a local key generation amount and a local key storage amount is smaller than a threshold, the control unit 101 calculates the link cost and the amount that can be guaranteed for the local key 301, and to select the relay route. For example, when the local key generation amount decreases due to changes in the environment, presence of an eavesdropper, and the like, the local key storage amount also decreases. Since there is a possibility that the global key guarantee amount cannot be guaranteed when the local key storage amount decreases, the amount of the global key 401 can be guaranteed by recalculating the global key relay route.

The management unit 102 manages key resources such as the key of the link to which the node 100 is connected, the key generation speed, and the amount of stored key.

The platform unit 103 provides computer operating system functions, basic network functions, security functions, and the like necessary for managing and operating other components of the node 100.

The communication unit 104 communicates with another node 100 to which the node 100 is connected. The communication unit 104 is provided for each link and includes a quantum communication unit 105 and a classical communication unit 106, respectively. The example of FIG. 4 shows a case where the opposite node 100 is connected to the quantum communication unit 105 and the classical communication unit 106 by each of three links.

The quantum communication unit 105 is connected to another node 100 via a quantum communication channel and performs quantum communication with the other node 100. The quantum communication unit 105 uses quantum cryptography (QKD) to share a photon bit string (random number) for generating a local key (encryption key) with the node 100 connected by a link.

The classical communication unit 106 is connected to another node 100 via a classical communication channel and performs classical communication with the other node 100. Data exchanged between the nodes 100 via the classical communication unit 106 includes data such as the global key 401. Data such as the global key 401 is normally transmitted via the classical communication unit 106 by cryptographic communication using the local key 301 managed by the node 100.

The routing processing unit 110 executes routing (routing control) of the global key 401. The routing processing unit 110 includes a collection unit 111, a calculation unit 112, a guarantee unit 113, a selection unit 114, and a storage unit 115.

The collection unit 111 collects link information (see FIG. 7 described later) via the classical communication unit 106. The link information includes the status of the link to which the node 100 is connected, the network address of the link, the cost for each link, network information, and the like. The collection unit 111 also collects application pair information (see FIG. 6 described later) connected to the node 100. The collection unit 111 stores the collected link information and application pair information in the storage unit 115.

The calculation unit 112 uses the local key generation amount, the local key storage amount, and a local key reserved amount (an amount of the local key that has been reserved) of the link connected to the node 100 to calculate a link capacity (the amount of a local key that can be sent to the link) and the link cost based on the link capacity. The calculation unit 112 may further use the status and the QKD performance to calculate a link capacity and the link cost based on the link capacity.

The guarantee unit 113 calculates the amount that can be guaranteed for the local key 301 of each route from the link capacity and the link cost calculated by the calculation unit 112 and the global key guarantee amount collected by the collection unit 111. The guarantee unit 113 may further use the global key storage amount, the global key consumption amount, and the global key generation amount to calculate the amount that can be guaranteed for the local key 301.

The selection unit 114 creates an optimum path tree by selecting the optimum path with the optimum metric based on the link cost (metric) of the path candidates from among a plurality of path candidates reaching the destination node (node 100). The selection unit 114 creates a routing table from the optimum path tree and stores the routing table in the storage unit 115.

The storage unit 115 stores a database of link information (for example, local key generation amount, local key storage amount, a local key reservation amount (an amount of the local key to be used), status, and QKD performance), a database of application pair information (for example, global key guaranteed amount, global key storage amount, global key consumption amount, and global key generation amount), a routing table created by the selection unit 114, and the like.

Example of Quantum Cryptographic Communication Control Method

Figure 5:
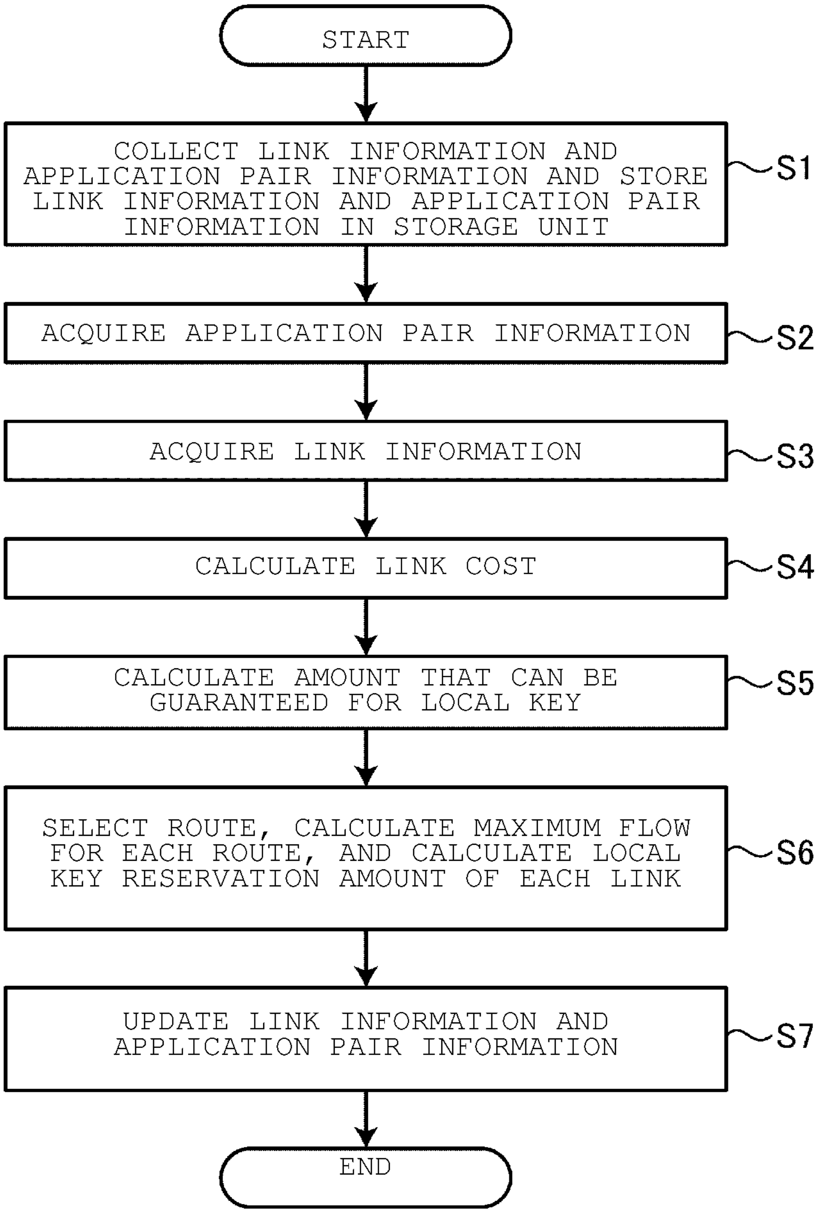
FIG. 5 is a flowchart showing an example of a quantum cryptographic communication control method according to the embodiment.

FIG. 5 is a flowchart showing an example of a quantum cryptographic communication control method of the embodiment. First, the collection unit 111 collects link information and application pair information, and stores the link information and application pair information in the storage unit 115 (step S1). Next, the calculation unit 112 acquires application pair information (for example, global key guarantee amount, global key storage amount, global key consumption amount, and global key generation amount) from the storage unit 115 (step S2). The calculation unit 112 may directly receive a request for application pair information (for example, global key guarantee amount, global key storage amount, global key consumption amount, and global key generation amount) from the application 200 without acquiring the application pair information from the storage unit 115.

FIG. 6 is a diagram showing an example of application pair information according to the embodiment. The application pair information of the embodiment includes application pair, domain, source node node 100, reception side base node 100, global key guarantee amount, key length, key guarantee start date and time, key guarantee end date and time, global key storage amount, global key consumption amount, and global key generation amount.

The application pair is information indicating a pair of applications 200 that perform cryptographic communication. The domain is information indicating an administrator (owner) of an application pair. The transmission side base node 100 is information indicating the base node 100 where the transmission side of the application pair is disposed. The reception side base node 100 is information indicating the base node 100 where the reception side of the application pair is disposed. The transmission side base and the reception side base are used as start and end points in route calculation.

The global key guarantee amount is the guarantee amount (bytes) of an encryption key (global key) per unit time (for example, 1 day, 1 hour, 1 minute, and the like) expected (required) by a user of an application pair (for example, administrator of the application pair and the like). For example, the global key guarantee amount is accepted by registration from the application 200 or a pair of applications 200. Also, for example, the global key guarantee amount may be accepted by registration from a user who uses a pair of applications 200. When the global key guarantee amount is not registered from the application 200 or a pair of applications 200, an amount of required global key may be estimated based on global key information other than the global key guarantee amount (global key consumption amount and global key generation amount). Also, for example, when the global key guarantee amount is not registered from a user, the global key requirement amount may be estimated based on global key information (global key consumption amount and global key generation amount) other than the global key guarantee amount. The global key guarantee amount or global key requirement amount is used as a parameter of the link cost.

The key length is the length of an encryption key (global key). The key guarantee start date and time is the guarantee start date and time of an encryption key (global key). The key guarantee end date and time is the guarantee end date and time of an encryption key (global key).

The global key storage amount is the storage amount (bytes) of an encryption key (global key) used in an application pair. The global key consumption amount is the consumption amount (bytes, bps) of an encryption key (global key) per unit time (for example, 1 day, 1 hour, 1 minute, and the like) used by an application pair. The global key generation amount is the amount (bytes, bps) of an encryption key (global key) generated per unit time (for example, 1 day, 1 hour, 1 minute, and the like) generated for an application pair.

Example application pair information is shown in FIG. 6. In the application pair information shown in FIG. 6, for example, the domain, key length, key guarantee start date and time, and key guarantee end date and time are optional, and the application pair information does not need to include, for example, the domain, key length, key guarantee start date and time, or key guarantee end date and time.

Returning to FIG. 5, subsequently, the calculation unit 112 acquires link information (for example, local key generation amount, local key storage amount, local key reserved amount, status, and QKD performance) from the storage unit 115 (step S3).

FIG. 7 is a diagram showing an example of link information according to the embodiment. The link information of the embodiment includes link status, network information, maximum local key storage amount, local key storage amount, local key generation amount, local key consumption amount, local key reserved amount, time, and QKD performance.

The link is information indicating a link to which the node 100 is connected. The status is the operating status of a link and the operating status of the nodes 100 forming the link. The network information is information (for example, transmission speed, reception speed, and the like) of the transmission base and reception base of the link.

The maximum local key storage amount is the maximum storage amount (bytes) of an encryption key (local key) of the link, and indicates the storage capacity of an encryption key (local key) of the link. The local key storage amount is the storage amount (bytes) of an encryption key (local key) of the link, and indicates the storage amount of an encryption key (local key) currently stored. The local key generation amount is the cumulative generation amount (bytes, bps) of an encryption key (local key) of the link.

The local key consumption amount is the cumulative consumption amount (bytes, bps) of an encryption key (local key) of the link. The local key reserved amount is the total value (bytes) of the amount of a local key reserved for the link in order to satisfy the guarantee amount of the global key 401 expected by each application pair. The local key consumption amount and the local key reserved amount are updated when a new relay route of the global key 401 is determined.

The time is a time stamp indicating the time when the link information is recorded. The QKD performance is the performance of a QKD device (node 100 in the example of FIG. 1). For example, the QKD performance is secure key generation amount, secure key rate, and error rate. The secure key is a key before the local key 301 is generated, and differs from the local key 301 in terms of not being divided into encryption and decryption.

Example link information is shown in FIG. 7. In the link information shown in FIG. 7, for example, the status is optional, and the link information may not include, for example, the status.

Returning to FIG. 5, subsequently, the calculation unit 112 calculates the link capacity and the link cost based on the link capacity by using the link information acquired in step S3 (step S4). The link cost is used to calculates the amount that can be guaranteed for the local key 301 and select (extract) the relay route of the global key 401.

In the calculation of the link capacity in step S4 and the link cost using the link capacity, for example, the following parameters included in the link information are used.

Local Key Generation Amount Per Unit Time: $N_{gen}$

The calculation unit 112 estimates the future local key generation amount $N_{gen}$ from the past local key generation amount in order to take into consideration the fluctuation in the key generation amount of each link by QKD, and uses the local key generation amount $N_{gen}$ to calculate the link cost.

Local Key Reserved Amount Per Unit Time: $N_{rsv}$

The calculation unit 112 uses the local key reserved amount $N_{rsv}$ to calculate the link cost in order to prevent the local key reserved for guaranteeing the QoS of the application pair (for example, communication speed when the expected encryption strength is satisfied) from being consumed.

Current Local Key Storage Amount $N_{cur}$

The calculation unit 112 uses the current local key storage amount $N_{cur}$ to calculate the link cost.

The calculation unit 112 calculates the link cost by using a link capacity $N=N_{gen}+N_{cur}-N_{rsv}$. That is, in the calculation of the link cost, the link capacity N is used, which is a value obtained by adding the current local key storage amount $N_{cur}$ to the local key generation amount $N_{gen}$ to be generated in the future and subtracting the reserved local key amount $N_{rsv}$. By subtracting the local key reserved amount $N_{rsv}$, it is possible to calculate a route so that the key reserved for other applications 200 is not used.

In the link information, at least one of the local key generation amount $N_{gen}$ of the local key 301 generated in the link and the local key storage amount $N_{cur}$ of the local key 301 used in the link, and the local key reserved amount $N_{rsv}$ reserved in the link may be included. For example, when there is the local key generation amount $N_{gen}$, the calculation unit 112 calculates the link capacity $N=N_{gen}-N_{rsv}$ of the link, and calculates the link cost based on the link capacity N. Further, for example, when there is the local key storage amount $N_{cur}$, the calculation unit 112 calculates the link capacity $N=N_{cur}-N_{rsv}$ of the link, and calculates the link cost based on the link capacity N.

Next, an example of the formula for calculating the link cost in step S4 will be given.

The calculation unit 112 selects the following formula of a linear function, an inverse proportional function, or an exponential function as a link cost calculation formula depending on the degree of influence on the link cost by the magnitude of the input parameter.

1. Linear Function $C=N_{max}-\alpha N+\beta$

Here, $N_{max}$ is the maximum local key storage amount, N is the link capacity described above, and α and β are weighting factors. The linear function may be used when it is desired to increase the link cost as the local key amount decreases.

2. Inverse proportional function $C=\alpha/N+\beta$

The inverse proportional function may be used when it is desired to reduce the cost as the amount of a local key is large and increase the cost as the amount of a local key is small.

3. Exponential function $C=\alpha\gamma^{N}+\beta(0<\gamma<1)$

The exponential function may be used when it is desired to increase the contribution to the link cost in order to avoid exhaustion when the amount of a local key is small compared to when the amount of a local key is large.

The calculation unit 112 calculates a link cost C to be smaller as the link capacity N is larger, for example, by using the above linear function. As a result, since the selection unit 114 can preferentially select a relay route in which more of the global key 401 can be relayed, based on the link cost C, it is possible to distribute the load of the local key consumption amount of each link and reduce the risk of a local key being exhausted.

Also, for example, in the calculation of the link capacity in step S4 and the link cost using the link capacity, the following parameters included in the link information may be used.

Error Rate e

The calculation unit 112 directly uses an error rate e (%), which is one of the QKD performances. Alternatively, when an error rate q is equal to or greater than a threshold, the calculation unit 112 sets the link cost to a large value such as infinity. For example, when the threshold is 10, the error rate q is as follows.

Variable $e=\infty$ (when $q\geq 10(\%)$) based on error rate q (%), $e=q$ (when $q<10(\%)$)

Secure Key Generation Amount Per Unit Time (Rate): $K_{gen}$

The calculation unit 112 may use the above-described secure key generation amount (rate) $K_{gen}$, which is one of the QKD performances, instead of the above-described local key generation amount $N_{gen}$.

Flag of Link Status s

The calculation unit 112 sets the link cost to a large value such as infinity when the link is not in operation. Further, even when one of the two nodes 100 forming a link is not in operation, the calculation unit 112 sets the link evaluation value of the link to a large value such as infinity.

Variable s=1 based on link operating status (when the link is in operation), $S=\infty$ (when the link is not in operation).

By introducing parameters for evaluating the link status and link performance described above, it is possible to perform route calculation for transferring the global key 401 in consideration of a route with a better status.

Further, for example, a link cost $C^2$ may be calculated by introducing an additional parameter to the link cost calculation formula C shown in 1. to 3. described above in step S4. The following formulas in 4. to 6. are not limited to one, and may be used in combination.

4. $C^2=eC$ (Introduction of Error Rate *e*)

Eavesdropping is detected at an error rate e, and the above link cost is multiplied by the error rate e. This formula may be used when it is desired to increase the link cost as the error rate e increases.

5. $C^2=C/K_{gen}$ (Introduction of Secure Key)

This formula may be used when it is desired to reduce the link cost as the amount (rate) of secure key generation increases.

6. $C^2=sC$ (Introduction of Link Status $s$)

This formula may be used when it is desired to increase the link cost when the link is not in operation.

Also, for example, in the calculation of the link capacity in step S4 and the link cost using the link capacity, the following parameters included in the application pair information may be used. That is, the calculation unit 112 may calculate the link cost further based on the global key storage amount, the global key consumption amount, and the global key generation amount.

Global Key Storage Amount $G_{cur}^{u,v}$

The calculation unit 112 uses a storage amount $G_{cur}^{u,v}$ (current storage amount) of an encryption key (global key 401) of the application pair between a base u and a base v. Since the already stored global key 401 can be used as part of the global key guarantee amount by using the global key storage amount $G_{cur}^{u,v}$, the global key requirement amount, which will be described later, can be set smaller. Alternatively, the calculation unit 112 introduces the global key storage amount $G_{cur}^{u,v}$ into the link cost calculation formula.

Global Key Consumption Amount $G_{used}^{u,v}$

The calculation unit 112 uses the consumption amount (actually used amount) of an encryption key (global key 401) of the application pair between the base u and the base v. By using the global key consumption amount $G_{used}^{u,v}$, it is possible to quantify the usage tendency of the global key 401 so far and estimate the global key requirement amount, which will be described later. Alternatively, the calculation unit 112 introduces the global key consumption amount $G_{used}^{u,v}$ into the link cost calculation formula.

Global Key Generation Amount $G_{gen}^{u,v}$

The calculation unit 112 uses the generation amount (generated amount) of an encryption key (global key 401) of the application pair between the base u and the base v. By using the global key generation amount $G_{gen}^{u,v}$, it is possible to quantify the generation tendency of the global key 401 so far and estimate the global key requirement amount, which will be described later. Alternatively, the calculation unit 112 introduces the global key generation amount $G_{gen}^{u,v}$ into the link cost calculation formula.

By estimating the global key requirement amount or calculating the link cost by using the parameters related to the global key 401 described above, it is possible to set a route that efficiently guarantees the global key guarantee amount described later without waste.

Further, for example, a link cost $C^3$ may be calculated by introducing an additional parameter to the link cost calculation formula C shown in formulas 1 to 3 described above in step S4. The following formulas in 7 to 9 are not limited to one, and may be used in combination.

7. $C_{ik}^3=C_{ik}-\alpha G_{cur}^{u,v}$ (Introduction of Global Key Storage Amount $G_{cur}^{u,v}$)

$$C_{kj}^3=C_{kj}-\alpha G_{cur}^{u,v}$$

Here, k indicates any base (node 100), and i and j indicate either the base u or v (node 100). $C_{ik}$ indicates the link cost between bases i and k, and $C_{kj}$ indicates the link cost between bases k and j. This formula may be used when it is desired to subtract a value based on the already stored global key storage amount $C_{cur}^{u,v}$ (value multiplied by weighting factor $\alpha$) in an application pair between the base u and the base v from the link cost of the link connecting the start point base u and the end point base v of the application pair.

8. $C_{ik}^3=C_{ik}+\alpha G_{used}^{u,v}$ (Introduction of Global Key Consumption Amount $G_{used}^{u,v}$)

$$C_{kj}^3=C_{kj}+\alpha G_{used}^{u,v}$$

This formula may be used when it is desired to add a value based on the past global key consumption amount $G_{used}^{u,v}$ (value multiplied by weighting factor $\alpha$) in an application pair between the base u and the base v to the link cost of the link connecting the start point base u and the end point base v of the application pair.

9. $C_{ik}^3=C_{ik}+\alpha G_{gen}^{u,v}$ (Introduction of Global Key Generation Amount $G_{gen}^{u,v}$)

$$C_{kj}^3=C_{kj}+\alpha G_{gen}^{u,v}$$

This formula may be used when it is desired to add a value based on the past global key generation amount $G_{gen}^{u,v}$ (value multiplied by weighting factor $\alpha$) in the application pair between the base u and the base v to the link cost of the link connecting the start point base u and the end point base v of the application pair.

Further, in step S4, the calculation unit 112 may estimate the global key requirement amount that actually needs to be generated. An example of estimating a global key requirement amount H is given below. When the estimated global key requirement amount H is a negative value, the global key requirement amount is set to zero.

1. When Global Key Guarantee Amount is Not Set (Global Key Consumption Amount $G_{used}$ is Used)

$$H=\alpha G_{used}-\beta G_{cur}$$

The calculation unit 112 estimates the global key requirement amount H from the past global key consumption amount $G_{used}$ and the global key storage amount $G_{cur}$.

2. When Global Key Guarantee Amount is Not Set (Global Key Generation Amount $G_{gen}$ is Used)

$$H=\alpha G_{gen}-\beta G_{cur}$$

The calculation unit 112 estimates the global key requirement amount H from the past global key generation amount $G_{gen}$ and the global key storage amount $G_{cur}$.

3. When the Global Key Guarantee Amount $H_{in}$ is Registered $$H=H_{in}-\alpha(G_{gen}-G_{used})-\beta G_{cur}$$

The calculation unit 112 calculates the global key amount estimated to be required from the difference between the global key generation amount $G_{gen}$ and the global key consumption amount $G_{used}$. Then, the calculation unit 112 estimates the global key requirement amount H by further subtracting the global key storage amount $G_{cur}$ from the difference between the registered global key guarantee amount $H_{in}$ and the global key amount estimated to be required.

Subsequently, the guarantee unit 113 calculates the amount that can be guaranteed for a local key of each route by using the global key guarantee amount $H_{in}$ acquired in step S2, the amount of a local key that can be used in the link calculated from the link information (for example, local key generation amount, local key storage amount, local key reserved amount, status, and QKD performance) acquired in step S3, and the link cost calculated in step S4 (step S5).

Instead of the global key guarantee amount $H_{in}$, the above-described global key requirement amount H estimated by using the global key storage amount, the global key consumption amount, and the global key generation amount may be used. That is, when the global key requirement amount H is estimated, the guarantee unit 113 may calculate the amount that can be guaranteed for the local key 301 used in the link so as to satisfy the global key requirement amount.

Subsequently, the selection unit 114 selects a route, calculates the maximum flow that can flow for each route (equivalent to the minimum local key amount among the capacities of all the links existing in the route), and calculates the local key reservation amount of each link (step S6).

Specifically, the selection unit 114 first prioritizes the routes by listing the routes in ascending order of the link cost calculated in step S4. The selection unit 114 selects, from the prioritized routes, the utilization route that takes the maximum flow from the amount that can be guaranteed for a local key of each route calculated in step S5 (selection of the minimum cost maximum flow). That is, the selection unit 114 calculates a minimum cost maximum flow problem for the start point node 100 and the end point node 100. Then, the selection unit 114 calculates the local key reservation amount of each link so as to satisfy the global key guarantee amount acquired in step S2.

It becomes possible to select a route for distributing the amount of the global key 401 expected by the application pair by selecting a route so as to satisfy the global key guarantee amount requested by the application pair (by giving the global key guarantee amount as a parameter of the maximum flow problem to solve the problem). At this time, routes may be selected to satisfy the global key requirement amount H instead of the global key guarantee amount.

Subsequently, the selection unit 114 updates the link information and the application pair-link information (step S7). Specifically, the selection unit 114 calculates the local key reserved amount $N_{rsv}=\Sigma n_{rsv}$ of all application pairs of each link from the local key reservation amount $n_{rsv}$ of each application pair of each link calculated in step S6, and updates the local key reserved amount $N_{rsv}$ included in the link information managed by the storage unit 115. In addition, the selection unit 114 updates the local key reserved amount included in the application pair-link information using the local key reservation amount $n_{rsv}$ of each application pair of each link calculated in step S6.

By setting (updating) the local key reserved amount $N_{rsv}$ for each link, when calculating a next key relay (distribution) route, it is possible to determine the relay route of the global key 401 so as not to violate the amount of a local key used by other application pairs.

FIG. 8 is a diagram showing an example of application pair-link information according to the embodiment. The application pair-link information of the embodiment includes link, application pair, local key reserved amount, key reservation start date and time, and key reservation end date and time. Links and application pairs are the same as described above. The link and application pair are used as a composite key to identify the data contained in the application pair-link information.

The local key reserved amount is the local key amount (bytes) reserved in order to satisfy the global key guarantee amount expected by one application pair for the link. The key reservation start date and time is the guarantee (reservation) start date and time of the encryption key (global key 401). The key reservation end date and time is the guarantee (reservation) end date and time of the encryption key (global key 401).

Example application pair-link information is shown in FIG. 8. In the application pair-link information shown in FIG. 8, for example, the key reservation start date and time and the key reservation end date and time are optional, and the application pair-link information does not need to include, for example, the key reservation start date and time and the key reservation end date and time.

As described above, in the node 100 of the embodiment, the collection unit 111 collects link information of a link for which a local key is generated by quantum key distribution and a global key guarantee amount expected for a pair of applications 200 that perform cryptographic communication by using a global key. The calculation unit 112 calculates a link cost used for selecting a relay route of the global key based on the link information. The guarantee unit 113 calculates the amount that can be guaranteed for a local key used in the link so as to satisfy the global key guarantee amount. Then, the selection unit 114 selects a relay route of the global key based on the link cost and the amount that can be guaranteed for the local key.

As a result, according to the node 100 of the embodiment, the QoS originally expected by the application 200 can be guaranteed. That is, it is possible to guarantee the supply of an encryption key (global key 401) expected by each application 200.

For example, since the global key relay route can be determined so as to satisfy the pre-registered global key guarantee amount, it is possible to guarantee the supply of the global key (QOS) in the amount necessary for communication encryption of the application 200 to users of the QKD service.

Further, the node 100 of the embodiment holds the local key reserved amount to be consumed in each link when determining a relay route that satisfies the global key guarantee amount, and uses the local key reserved amount to calculate the link cost of each link. As a result, it is possible to determine a relay route so as not to hinder the supply of the global key 401 (QOS) to other users of the QKD service.

Modification Example 1 of Embodiment

Next, Modification Example 1 of the embodiment will be described. In the description of Modification Example 1, descriptions that are the same as those of the embodiment will be omitted, and portions that are different from the embodiment will be described.

Example of Configuration

Figure 9:
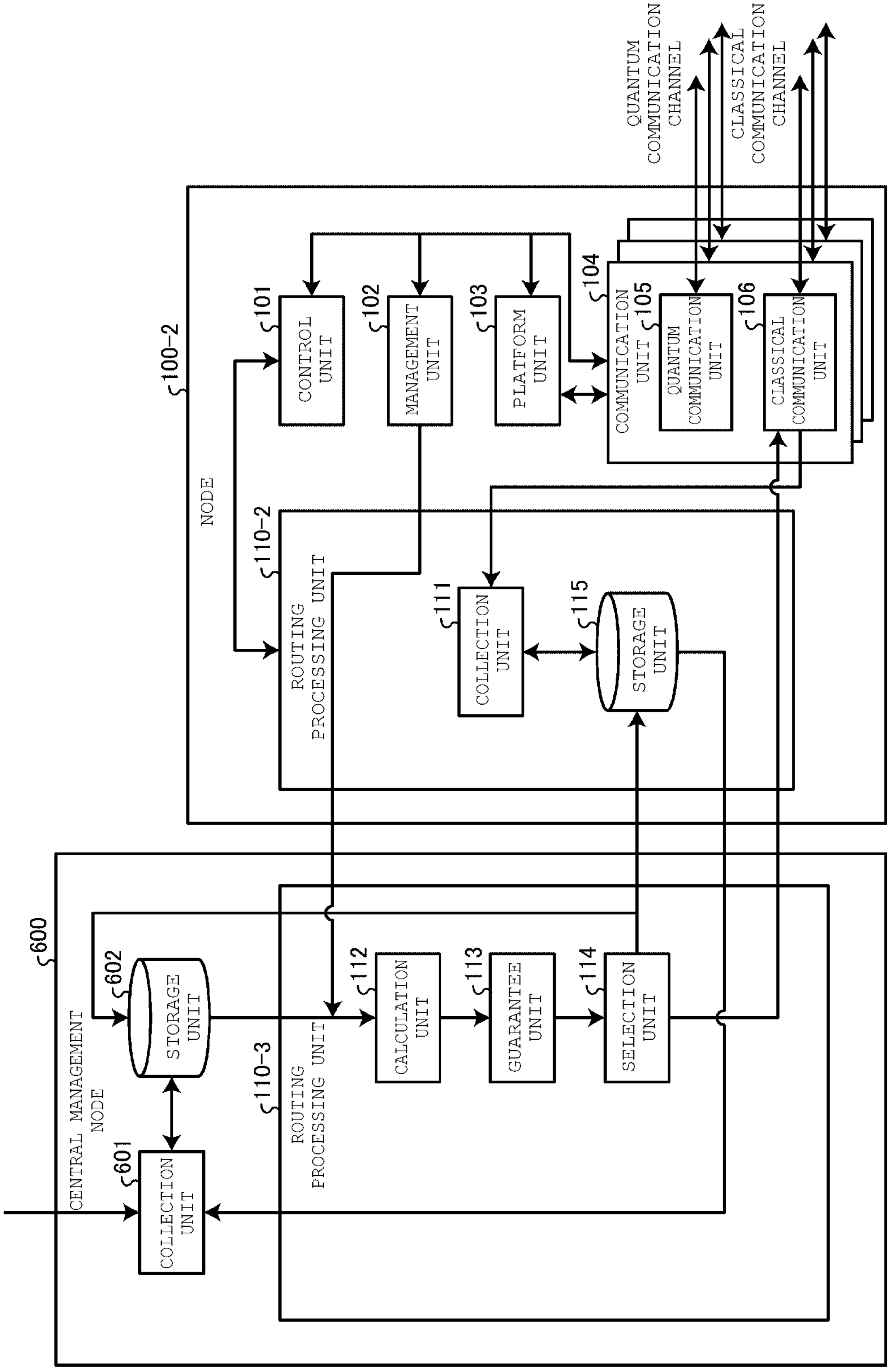
FIG. 9 is a diagram showing an example of a configuration of Modification Example 1 of the embodiment.

FIG. 9 is a diagram showing an example of the configuration of Modification Example 1 of the embodiment. In Modification Example 1, the node 100 of the embodiment described above is separated into a node 100-2 and a central management node 600.

The node 100-2 includes a control unit 101, a management unit 102, a platform unit 103, a communication unit 104, and a routing processing unit 110-2. The routing processing unit 110-2 includes a collection unit 111 and a storage unit 115.

The central management node 600 (an example of a quantum cryptographic communication control device) includes a collection unit 601, a storage unit 602, and a routing processing unit 110-3. The routing processing unit 110-3 includes a calculation unit 112, a guarantee unit 113, and a selection unit 114.

As shown in FIG. 9, the central management node 600 may perform route calculation processing by the calculation unit 112, the guarantee unit 113, and the selection unit 114.

Modification Example 2 of Embodiment

Next, Modification Example 2 of the embodiment will be described. In the description of Modification Example 2, descriptions that are the same as those of the embodiment will be omitted, and portions that are different from the embodiment will be described.

Example of Configuration

Figure 10:
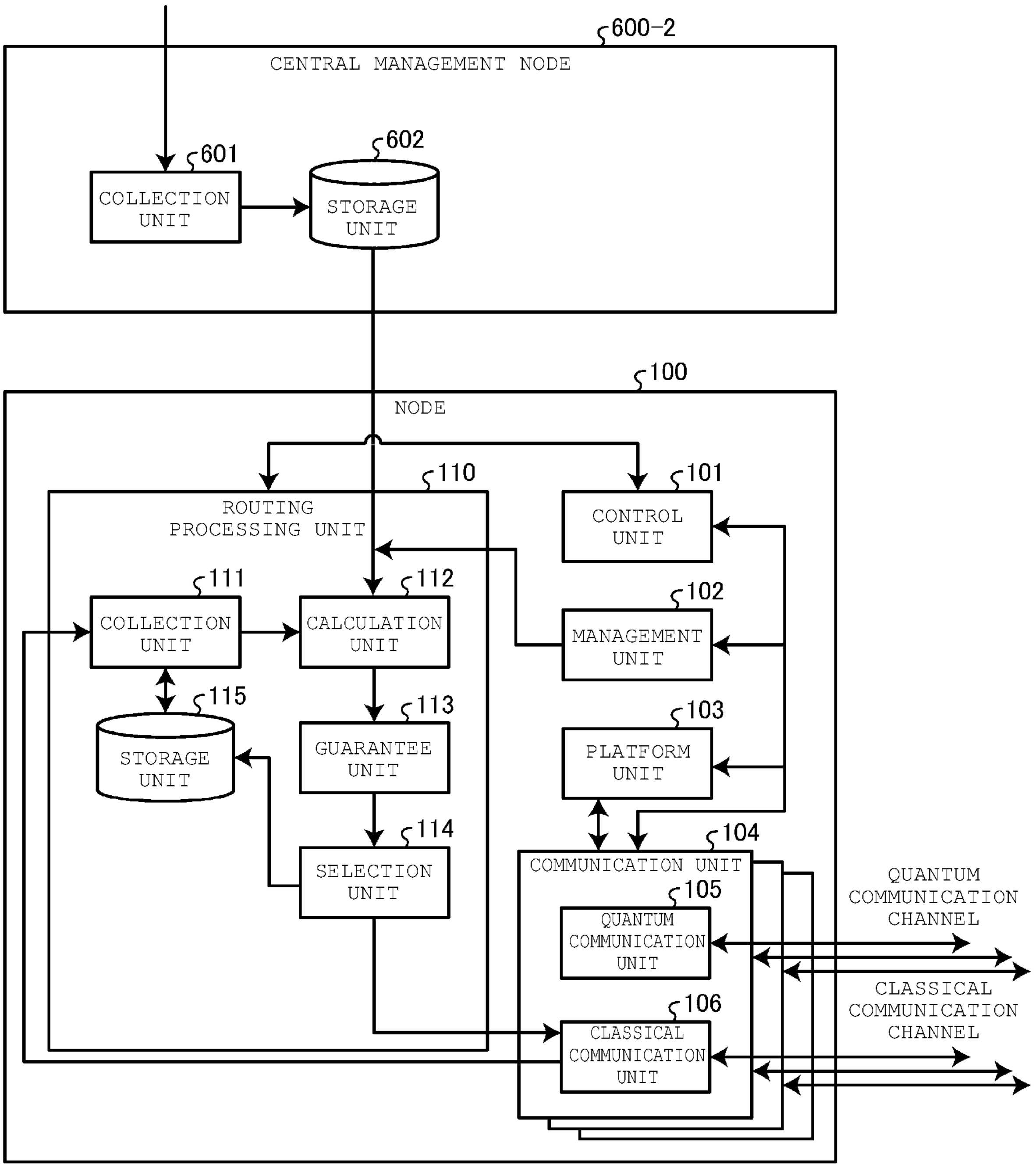
FIG. 10 is a diagram showing an example of a configuration of Modification Example 2 of the embodiment.

FIG. 10 is a diagram showing an example of the configuration of Modification Example 2 of the embodiment. In Modification Example 2, the node 100 of the embodiment described above is separated into a node 100 and a central management node 600-2.

The configuration of the node 100 (an example of a quantum cryptographic communication control device) of Modification Example 2 is the same as that of the embodiment. The central management node 600-2 includes a collection unit 601 and a storage unit 602.

As shown in FIG. 10, each node 100 may perform route calculation processing to perform distributed processing of the route calculation, and the storage unit 602 of the central management node 600 may store the route calculation results performed by each node 100.

Finally, an example of the hardware configuration of the node 100 and the central management node 600 of the embodiment will be described. Since the node 100 and the central management node 600 have the same hardware configuration, the case of the node 100 will be described as an example.

Example of Hardware Configuration

Figure 11:
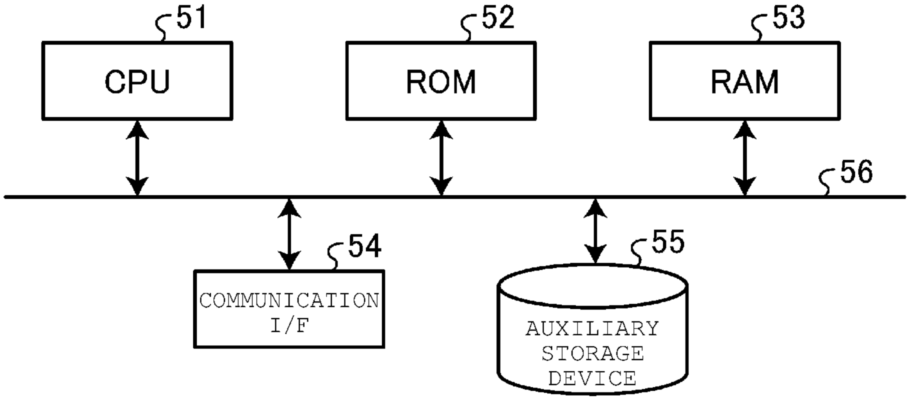
FIG. 11 is a diagram showing an example of a hardware configuration of the node according to the embodiment.

FIG. 11 is a diagram showing an example of the hardware configuration of the node 100 of the embodiment. The node 100 includes a central processing unit (CPU) 51, a read only memory (ROM) 52, a random access memory (RAM) 53, a communication I/F 54, and an auxiliary storage device 55. The CPU 51, ROM 52, RAM 53, communication I/F 54, and auxiliary storage device 55 are connected via a bus 56.

The CPU 51 (an example of a processor) executes programs read from the ROM 52 (an example of a main storage device), the auxiliary storage device 55, and the like in the RAM 53. The auxiliary storage device 55 is a hard disk drive (HDD), a memory card, or the like.

The node 100 may further include a display device for displaying the status of the node 100, an input device for receiving input from a user, and the like.

The communication I/F 54 includes a quantum communication I/F and a classical communication I/F. The quantum communication I/F is an interface for connecting to the quantum communication channel (optical fiber link). The classical communication I/F is an interface for connecting to the classical communication channel.

A program executed by the node 100 is stored in a non-transitory computer-readable storage medium such as a CD-ROM, a memory card, a CD-R, a digital versatile disc (DVD), or the like, as a file in an installable format or an executable format to be provided as a computer program product.

Alternatively, the program executed by the node 100 may be configured to be stored on a computer connected to a network such as the Internet so as to be provided by being downloaded via the network.

Alternatively, the program executed by the node 100 may be configured to be provided via a network such as the Internet without being downloaded.

Alternatively, the program to be executed by the node 100 may be configured to be pre-installed in a ROM or the like and provided.

The program executed by the node 100 may have a module configuration including functions that can be implemented by the program among the functional configurations of the node 100 described above. The functions implemented by the program are loaded into the RAM 53 by the CPU 51 reading the program from a storage medium such as the auxiliary storage device 55 and executing the program. That is, the functions implemented by the program are generated on the RAM 53.

Some or all of the functions of the node 100 may be implemented by hardware such as an integrated circuit (IC). The IC may be, for example, a processor that executes dedicated processing.

Further, when each function is implemented by using a plurality of processors, each processor may implement one of each function, or may implement two or more of each function.

While several embodiments of the present invention have been described, these embodiments have been presented by way of example and are not intended to limit the scope of the invention. These novel embodiments can be implemented in various other forms, and various omissions, replacements, and modifications can be made without departing from the scope of the invention. These embodiments and the modifications thereof are included in the scope and spirit of the invention, and are included in the scope of the invention described in the claims and equivalents thereof.

What is claimed is:

1. A quantum cryptographic communication control device comprising:

one or more hardware processors configured to:

collect link information about links of a key sharing network through which a global key encrypted by one or more local keys is transferred by quantum key distribution and collect a global key guarantee amount being an amount of global keys required by a pair of applications that perform cryptographic communication by using a global key;

calculate a link capacity of each link and a link cost used for selecting a route of the global key based on the link information;

calculate an amount that can be guaranteed for a local key of each route by using the global key guarantee amount, the link capacity, and the link cost; and select a route of the global key satisfying the global key guarantee amount based on the link cost and the amount that can be guaranteed for a local key of each route, the route of the global key being selected by calculating a minimum cost maximum flow problem for a start point and an end point of the key sharing network, the minimum cost maximum flow problem being given the global key guarantee amount as a parameter.

2. The quantum cryptographic communication control device according to claim 1, wherein the link information includes at least one of a local key generation amount of the local key generated in the link and a local key storage amount of the local key used in the link, and a local key reserved amount reserved in the link, and the one or more hardware processors are configured to calculate a link capacity of the link from at least one of the local key generation amount and the local key storage amount, and the local key reserved amount, and calculate the link cost based on the link capacity.

3. The quantum cryptographic communication control device according to claim 2, wherein the one or more hardware processors are configured to calculate the link cost such that the link cost decreases as the link capacity increases, and the one or more hardware processors are configured to preferentially select a route in which more of the global key can be relayed, based on the link cost.

4. The quantum cryptographic communication control device according to claim 2, wherein the one or more hardware processors are configured to control timing for calculating the link cost and the amount that can be guaranteed, and selecting the route.

5. The quantum cryptographic communication control device according to claim 4, wherein when a global key guarantee amount requested by a pair of new applications is added, when a global key guarantee amount of a pair of existing applications is deleted, when the global key guarantee amount of the pair of existing applications is changed, or when the global key guarantee amount can no longer be guaranteed in a current route, one or more hardware processors are configured to calculate the link cost and the amount that can be guaranteed and to select the route.

6. The quantum cryptographic communication control device according to claim 4, wherein the one or more hardware processors are configured to periodically calculate the link cost and the amount that can be guaranteed and to select the route.

7. The quantum cryptographic communication control device according to claim 4, wherein when at least one of the local key generation amount and the local key storage amount is smaller than a threshold, the one or more hardware processors are configured to calculate the link cost and the amount that can be guaranteed and to select the route.

8. The quantum cryptographic communication control device according to claim 2, wherein the global key guarantee amount is a global key amount required by the applications per unit time, and the global key guarantee amount is accepted by registration from a user using the pair of applications.

9. The quantum cryptographic communication control device according to claim 2, wherein the one or more hardware processors are configured to collect a global key storage amount of a global key used in the pair of applications, a global key consumption amount of the global key used in the pair of applications, and a global key generation amount of the global key used in the pair of applications, and the one or more hardware processors are configured to calculate the link cost further based on the global key storage amount, the global key consumption amount, and the global key generation amount.

10. The quantum cryptographic communication control device according to claim 1, wherein the one or more hardware processors are configured to collect a global key storage amount of a global key used in the pair of applications, a global key consumption amount of the global key used in the pair of applications, and a global key generation amount of the global key used in the pair of applications, the one or more hardware processors are configured to estimate a global key requirement amount based on at least one of the global key storage amount, the global key consumption amount, and the global key generation amount, and when the global key requirement amount is estimated, the one or more hardware processors are configured to calculate the amount that can be guaranteed for the local key used in the link so as to satisfy the global key requirement amount.

11. The quantum cryptographic communication control device according to claim 1, wherein the one or more hardware processors are configured to collect a global key storage amount of a global key used in the pair of applications, a global key consumption amount of the global key used in the pair of applications, and a global key generation amount of the global key used in the pair of applications, the one or more hardware processors are configured to calculate an actual global key amount from a difference between the global key generation amount and the global key consumption amount, and estimate a global key requirement amount by further subtracting the global key storage amount from a difference between the global key guarantee amount and the actual global key amount, and when the global key requirement amount is estimated, the one or more hardware processors are configured to calculate the amount that can be guaranteed for the local key used in the link so as to satisfy the global key requirement amount.

12. A quantum cryptographic communication control method comprising:

a step of collecting, by a quantum cryptographic communication control device comprising one or more hardware processors, link information of about links of a key sharing network through which a global key encrypted by one or more local keys is transferred by quantum key distribution;

a step of collecting, by the quantum cryptographic communication control device, a global key guarantee amount being an amount of global keys required by a pair of applications that perform cryptographic communication by using a global key;

a step of calculating, by the quantum cryptographic communication control device, a link capacity of each link and a link cost used for selecting a route of the global key based on the link information;

a step of calculating, by the quantum cryptographic communication control device, an amount that can be guaranteed for a local key of each route by using the global key guarantee amount, the link capacity, and the link cost; and a step of selecting, by the quantum cryptographic communication control device, a route of the global key satisfying the global key guarantee amount based on the link cost and the amount that can be guaranteed for a local key of each route, the route of the global key being selected by calculating a minimum cost maximum flow problem for a start point and an end point of the key sharing network, the minimum cost maximum flow problem being given the global key guarantee amount as a parameter.

13. A non-transitory computer-readable storage medium storing a program thereon, wherein the program causes a computer to execute:

collecting link information of about links of a key sharing network through which a global key encrypted by one or more local keys is transferred by quantum key distribution;

collecting a global key guarantee amount being an amount of global keys required by a pair of applications that perform cryptographic communication by using a global key;

calculating a link capacity of each link and a link cost used for selecting a route of the global key based on the link information;

calculating an amount that can be guaranteed for a local key of each route by using the global key guarantee amount, the link capacity, and the link cost; and selecting a route of the global key satisfying the global key guarantee amount based on the link cost and the amount that can be guaranteed for a local key of each route, the route of the global key being selected by calculating a minimum cost maximum flow problem for a start point and an end point of the key sharing network, the minimum cost maximum flow problem being given the global key guarantee amount as a parameter.

* * * * *